US008544113B1

(12) United States Patent
Boettcher et al.

(10) Patent No.: US 8,544,113 B1
(45) Date of Patent: Oct. 1, 2013

(54) OUTFIT FOR SIMULATING PREGNANCY

(75) Inventors: Timmothy A. Boettcher, Eau Claire, WI (US); Gary T Herbison, Eau Claire, WI (US); Joel B. Roberts, Eau Claire, WI (US); Shane E. Mooney, Eau Claire, WI (US); Jeremiah R. Bauer, Mondovi, WI (US)

(73) Assignee: Realityworks, Inc., Eau Claire, WI (US)

( * ) Notice: Subject to any disclaimer, the term of this patent is extended or adjusted under 35 U.S.C. 154(b) by 1785 days.

(21) Appl. No.: 11/439,096

(22) Filed: May 23, 2006

Related U.S. Application Data

(60) Provisional application No. 60/701,393, filed on Jul. 21, 2005.

(51) Int. Cl.
*A41D 13/00* (2006.01)

(52) U.S. Cl.
USPC .................................................. 2/69; 434/262

(58) Field of Classification Search
USPC ................... 2/69, 1; 434/262, 266, 267, 273, 434/268; 446/26, 28
See application file for complete search history.

(56) References Cited

U.S. PATENT DOCUMENTS

| 4,241,459 A | * | 12/1980 | Quayle | 2/102 |
| 4,268,917 A | * | 5/1981 | Massey | 2/102 |
| 4,531,919 A |   | 7/1985 | Ware |  |
| 6,200,244 B1 | * | 3/2001 | Cook | 482/105 |

FOREIGN PATENT DOCUMENTS

JP  09146451 A * 6/1997

OTHER PUBLICATIONS www.emphathybelly.org.home/html.*

* cited by examiner

*Primary Examiner* — Richale Quinn
(74) *Attorney, Agent, or Firm* — Sherrill Law Offices, PLLC

(57) ABSTRACT

In one aspect the pregnancy simulation outfit comprises (i) a vest, (ii) a pair of protuberances configured and arranged on an upper portion of a frontal area of the vest for depicting the enlarged breasts of a pregnant woman when the vest is worn, (iii) a weighted element, and (iv) a pouch in a lower portion of the frontal area of the vest accessible from the outside surface of the vest for accommodating insertion and removal of the weighted element into and out from the pouch while the vest is worn without doffing the vest. In a second aspect, the pregnancy simulation outfit comprises (a) a vest configured and arranged to bestow a frontal profile depicting a pregnant woman upon a wearer, (b) a pair of firm objects, and (c) a laterally elongated constriction belt configured and arranged to be worn around the midsection and having a pair of laterally spaced pockets configured and arranged for accommodating one of the firm objects into each of the pockets and pressing the firm object retained within each pocket against the diaphragm when the constriction belt is worn.

7 Claims, 4 Drawing Sheets

OUTFIT FOR SIMULATING PREGNANCY

This application claims the benefit of U.S. Provisional Application No. 60/701,393, filed Jul. 21, 2005.

FIELD OF INVENTION

The invention relates to pregnancy simulation devices, and more specifically to outfits for simulating pregnancy.

BACKGROUND

U.S. Pat. No. 4,531,919 discloses a outfit for simulating pregnancy. The outfit is a vest with areas configured and arranged to provide the appearance of enlarged breasts and an enlarged distended stomach when worn. A pouch is provided in the lower front portion of the outfit for accommodating (i) a primary weight for simulating the weight and positioning of a fetus, and (ii) a weighted bladder pillow for simulating the pressure exerted by a fetus upon the bladder. A belt is also provided for simulating the pressure exerted against the diaphragm.

While the pregnancy simulation outfit disclosed in U.S. Pat. No. 4,531,919 is generally effective for permitting persons to experience the trials and travails associated with pregnancy, a continuing need exists for an improved pregnancy simulation outfit.

SUMMARY OF THE INVENTION

A first aspect of the invention is a pregnancy simulation outfit, includes a vest with a pair of protuberances, a frontal pouch, and a weighted element. The vest is configured and arranged to be worn over a human torso and has an inside surface, an outside surface and a frontal area with an upper portion and a lower portion. The pair of protuberances are configured and arranged on the upper portion of the frontal area of the vest for depicting the enlarged breasts of a pregnant woman when the vest is worn. The pouch is positioned in the lower portion of the frontal area of the vest and is accessible from the outside surface of the vest for accommodating insertion and removal of the weighted element into and out from the pouch while the vest is worn without doffing the vest.

A second aspect of the invention is a pregnancy simulation outfit, includes a vest, a pair of firm objects and a constriction belt. The vest is configured and arranged to bestow a frontal profile depicting a pregnant woman upon a wearer. The constriction belt is configured and arranged to be worn around the midsection and has a pair of laterally spaced pockets configured and arranged for accommodating one of the firm objects into each of the pockets and pressing a firm object retained within each pocket against the diaphragm of a wearer.

DETAILED DESCRIPTION OF THE INVENTION INCLUDING A BEST MODE

Nomenclature

| | |
|---|---|
| 10 | Outfit |
| 20 | Vest |
| 20a | Upper Portion of Vest |
| 20b | Lower Portion of Vest |
| 20f | Frontal Area of Vest |
| 20i | Inside Surface of Vest |
| 20o | Outside Surface of Vest |
| 21 | Shoulder Straps |
| 22 | Fastener on the Shoulder Straps |
| 23 | Waist Straps |
| 24 | Fastener on the Waist Straps |
| 25 | Crotch Straps |
| 26 | Fastener on the Crotch Straps |
| 27 | Protuberances or Enlarged Breasts |
| 28 | Primary Pouch |
| 29 | Secondary Pouch |
| 30 | Water Bladder |
| 31 | Handle |
| 40 | Weight |
| 50 | Constriction Belt |
| 51 | Fastener on the Constriction Belt |
| 59 | Pockets on the Constriction Belt |
| 60 | Firm Objects |
| 100 | Person or Wearer |
| 101 | Torso |

Structure

Figure 1:
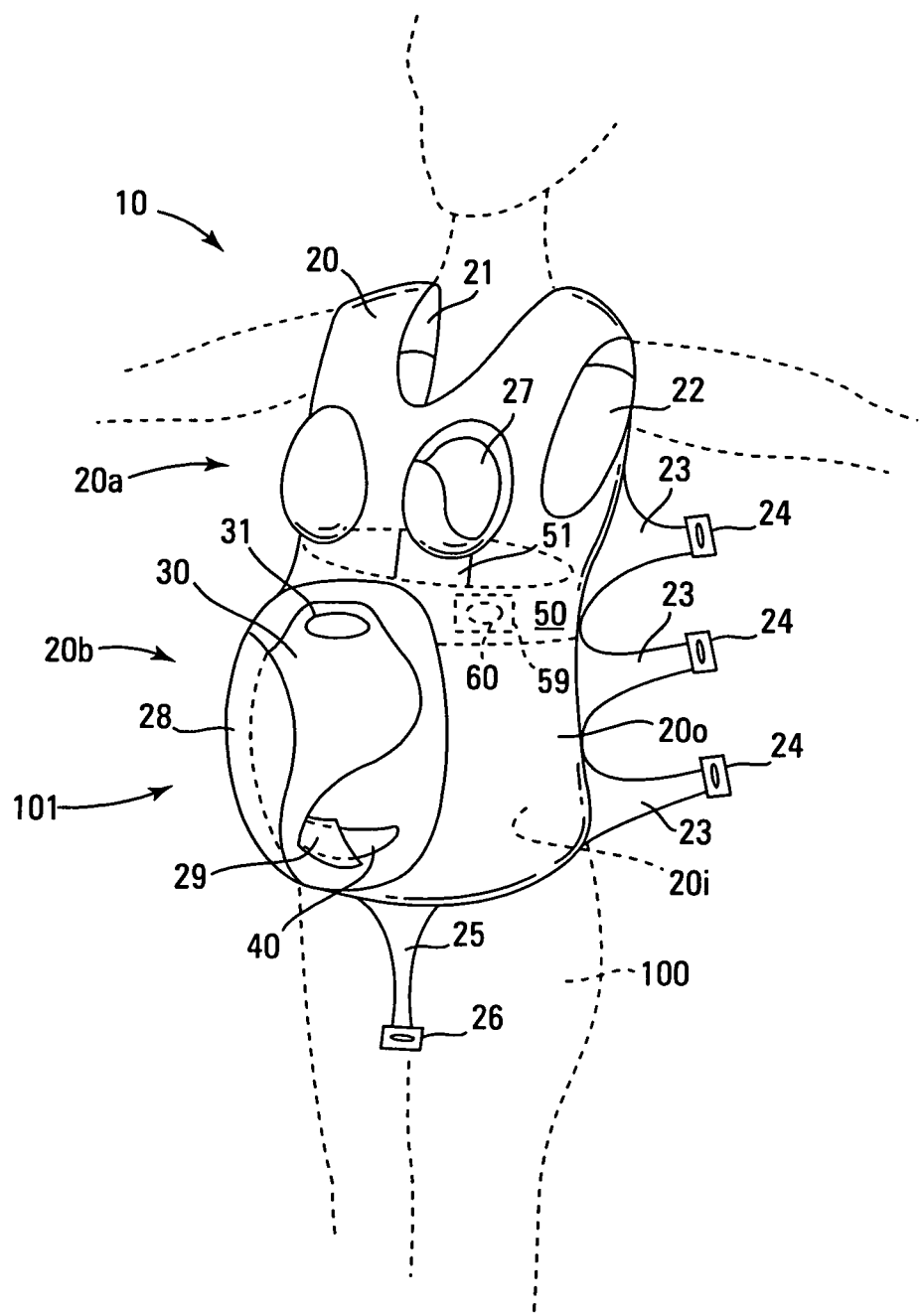
FIG. 1 is a perspective view of one embodiment of the invention with portions removed to facilitate viewing of internal components.
Figure 2:
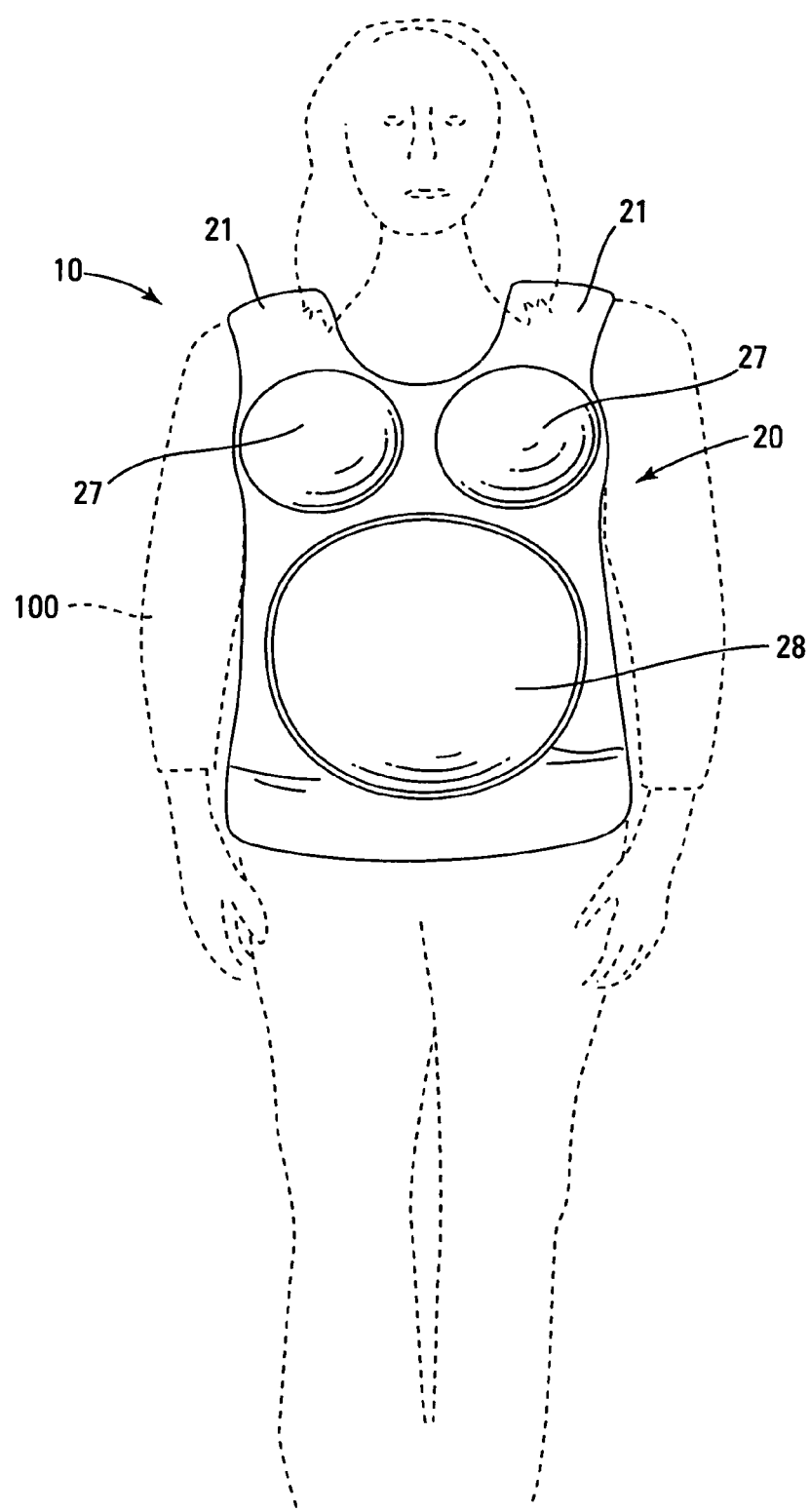
FIG. 2 is a fully assembled front view of the embodiment of the invention shown in FIG. 1 on a wearer.
Figure 3:
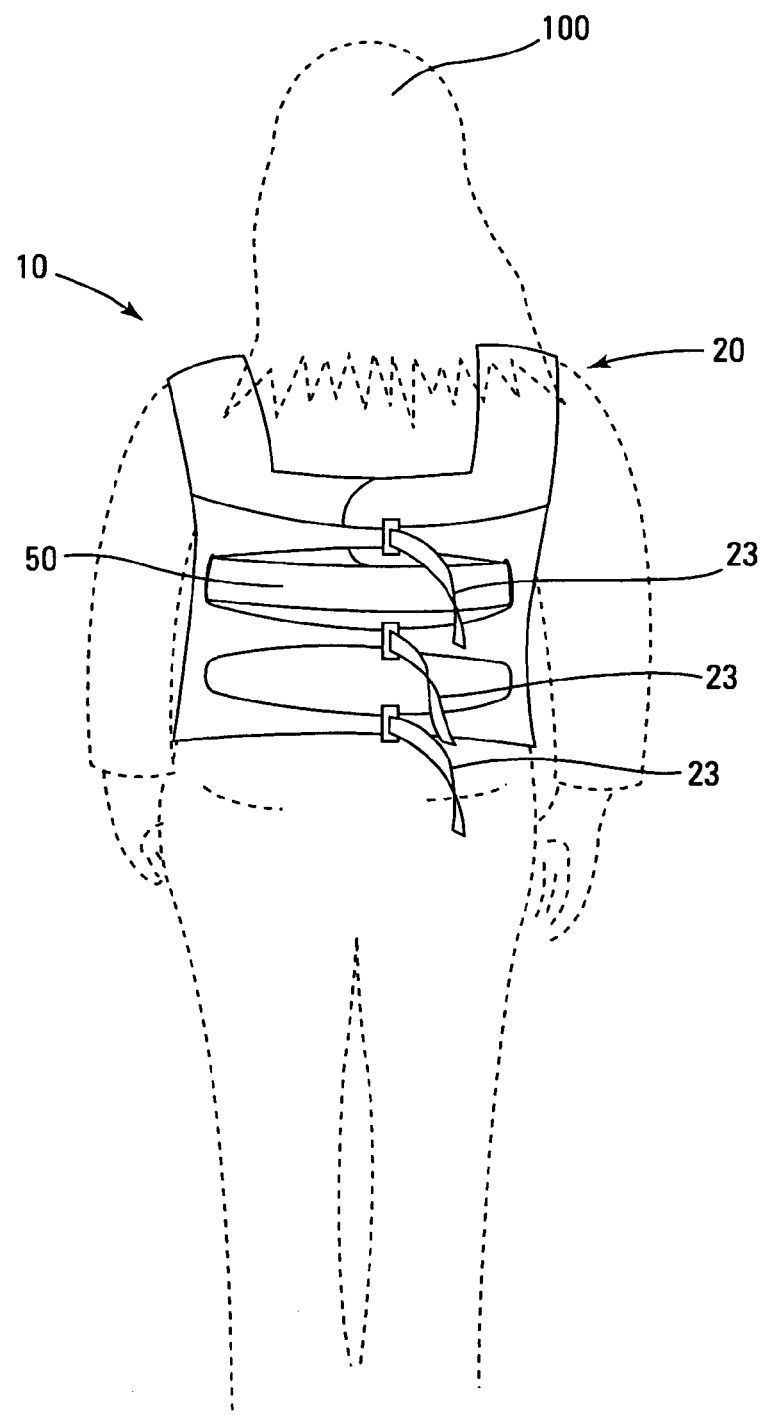
FIG. 3 is a fully assembled rear view of the embodiment of the invention shown in FIG. 1 on a wearer.
Figure 4:
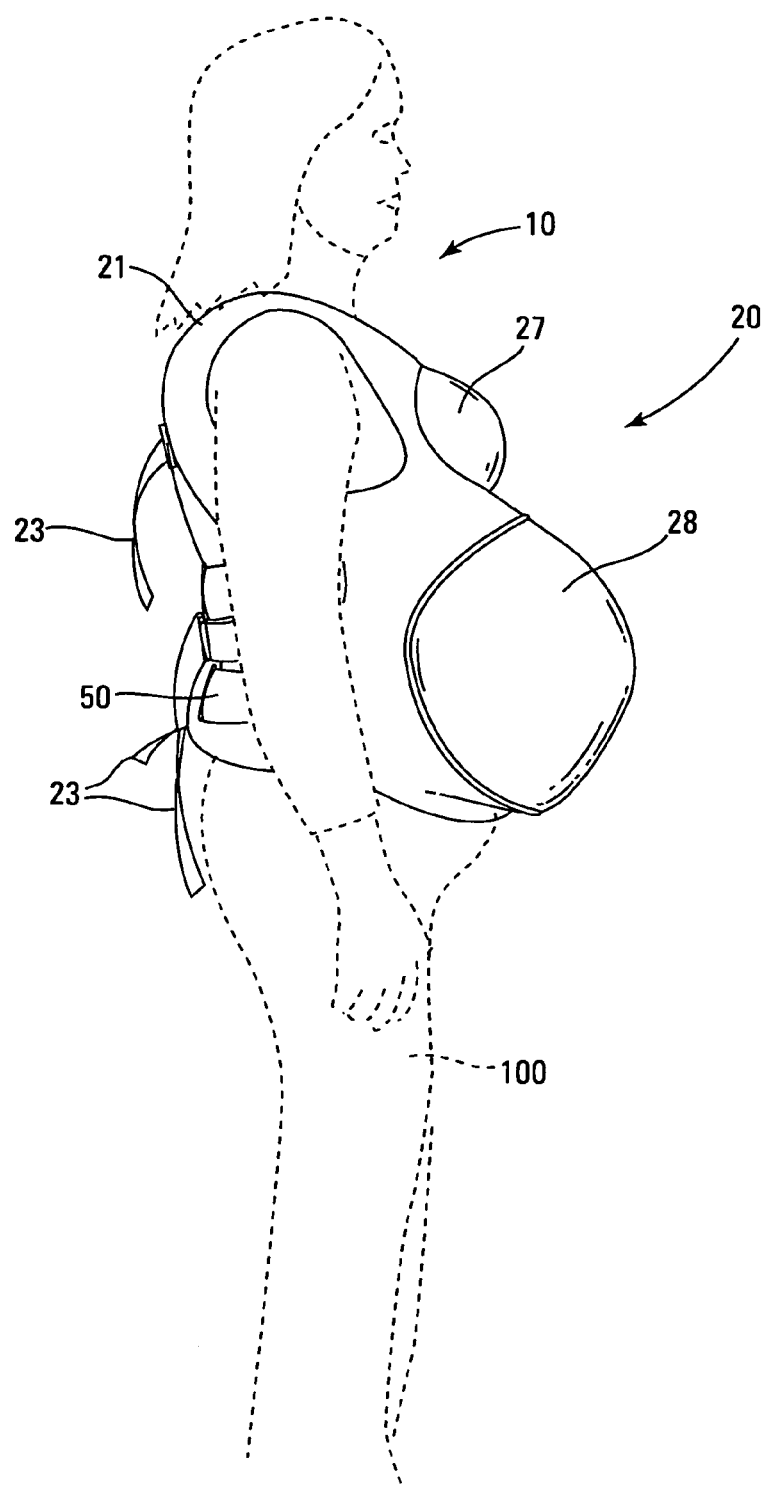
FIG. 4 is a fully assembled side view of the embodiment of the invention shown in FIG. 1 on a wearer.

As shown in FIGS. 1-4, one aspect of the invention is an outfit 10 which—when worn—simulates the appearance and sensations which accompany pregnancy. The outfit 10 is effective for allowing a wearer 100 to experience the physical and psychological effects of pregnancy.

The primary component of the outfit is a vest 20. The outside surface 20o of the upper portion 20a of the frontal area 20f of the vest 20 includes a pair of weighted protuberances 27 configured and arranged on the vest 20 to overly the chest (unnumbered) of a wearer 100 and simulate the appearance and weight of a pregnant woman's enlarged breasts when the vest 20 is worn. The outside surface 20o of the lower portion 20b of the frontal area 20f of the vest 20 has a padded primary pouch 28 configured and arranged to overly the abdomen (not shown) of a wearer 100 and simulate the appearance of a pregnant woman's protruding abdomen. A weighted element, such as a water-filled bladder 30, may be placed into the primary pouch 28 for simulating the shifting weight of a fetus (not shown) and the surrounding amniotic fluid (not shown). The outside surface 20o of the lower portion 20b of the frontal area 20f of the vest 20 may also include a secondary pouch 29 immediately below the primary pouch 28 which is configured and arranged to overlying the lower median region of the abdomen of a wearer 100. A weight 40, such as a sandbag or beanbag, may be placed into the secondary pouch 29 for exerting pressure against the urinary bladder of a wearer 100. Both the primary pouch 28 and the secondary pouch 29 in the vest 20 are accessible from the outside surface 20o of the vest 20 so that the water bladder 30 and weight 40 may be inserted and removed from the respective pouch 28 and 29 without doffing the vest 20. The water bladder 30 preferably includes an integral handle 31 for facilitating handling of the bladder 30 while filling, emptying, inserting and removing the bladder 30. The pouches 28 and 29 each preferably include a horizontally extending opening (not shown) equipped with a quick and simple closure mechanism (unnumbered) such as a cover flap with buckles, a cover flap with hook and loop tape, a cover flap with snaps, a zipper, etc. on the outside surface 20o of the vest 20 to prevent the accidental and unintentional loss of the water bladder 30 or weight 40 from the respective pouch 28 or 29.

The vest 20 includes shoulder straps 21, waist straps 23 and crotch straps 25, each with an adjustable-length fastening means 22, 24 and 26 respectively, such as hook and loop tape, buckles, rings, ring and snap combinations, etc., for providing a snug fitting of the vest 20 against the torso (101) of a wearer 100.

The vest 20 may be constructed from any of the materials commonly used in the manufacture of clothing including natural and synthetic fabrics, natural and synthetic leather, plastic sheets such as TYVEK™, and combinations thereof. The inside surface 20i of the vest 20 is preferably lined or padded—particularly on the shoulder straps 21, to provide a comfortable fit.

A weight (not shown), such as a rubber block or ball, may be suspended from a string (not shown) within the water bladder 30 for adding additional weight to the outfit 10 and simulating the sensation of a shifting fetus when the wearer 100 moves too quickly.

The outfit 10 may further include an optional but preferred constriction belt 50, such as a strap of elastic material with an adjustable-length fastening means 51, to be worn around the midsection (unnumbered) of a wearer 100 in order to place pressure upon the diaphragm (not shown) and thereby impair the ability to "catch a full breadth"—a condition commonly experienced by expectant women. A pair of laterally spaced pockets 59 may be provided on the constriction belt 50 for retaining a firm object 60. The pockets 59 are positioned on the constriction belt 50 so as to contact either side of the diaphragm of a wearer 100 in order to emulate the discomfort and irritation experienced when a fetus, typically a fetal limb, presses upward against the diaphragm. The pockets 59 may be configured and arranged to prevent removal of an inserted firm object 60 (e.g., the pockets 59 are sewn shut after insertion of a firm object 60), or removably retain a firm object 60 so as to permit a differently sized and/or shaped firm object 60 to be placed within the pocket 59 and facilitate laundering of the constriction belt 50.

The firm objects 60 may be constructed from any number of materials (e.g., glass, metal, plastic, rubber and wood), may have substantially any three-dimensional shape (e.g., tetrahedron, cube, octahedron, dodecahedron, rectangular parallelepiped, frustum of a right pyramid, right wedge, cylinder, frustum of a right cone, circular barrel, sphere, spherical sector, conical ring, etc.), and may have substantially any size from about 1 $cm^3$ to about 1,000 $cm^3$, preferrably about 10 $cm^3$ to about 300 $cm^3$. The firm objects 60 are preferably solid or hollow plastic or rubber spheres with a diameter of about 1 to about 8 cm. Preferred firm objects 60 include racquetball balls and tennis balls.

An alternative option is to include a single laterally elongated pocket 59 on the constriction belt 50 with the pocket 59 configured and arranged to accommodate a single insert (not shown) having two laterally spaced bumps or protrusions (not shown).

Use

The outfit 10 is used by (i) inserting the firm objects 60 into the pockets 59 on the constriction belt 50 unless the firm objects 60 are already positioned within the pockets 59, (ii) donning the constriction belt 50 with (A) an adjustment of the fastener 51 on the constriction belt 50 to achieve the desired level of constriction against the diaphragm of the wearer 100, and (B) a positioning of the firm objects 60 within each pockets 59 on either side of the body in contact with the diaphragm of the wearer 100, (iii) donning the vest 20, (iv) placing the weight 40 into the secondary pouch 29, (v) closing the secondary pouch 29, (vi) placing the water bladder 30—filled to the level necessary to achieve the desired weight—into the primary pouch 28, (vii) closing the primary pouch 28, (viii) fastening the shoulder straps 21, waist straps 23 and crotch straps 25 with sufficient tension to ensure a snug fit of the frontal area 20f of the vest 20 against the chest and abdomen of the wearer 100, and (ix) wearing the outfit 10 for a desired assignment period of from a few minutes to a week or more, preferably between about 10 minutes to 72 hours, most preferably between about 1 hour and 8 hours.

We claim:

1. A pregnancy simulation outfit, comprising: (a) a vest configured and arranged to bestow a frontal profile depicting a pregnant woman when worn, (b) a pair of roundish firm objects, and (c) a laterally elongated constriction belt configured and arranged to be worn around a midsection and having a pair of laterally spaced pockets configured and arranged for accommodating one of the firm objects into each of the pockets and pressing a firm object retained within each pocket against a diaphragm when the constriction belt is worn.

2. The pregnancy simulation outfit of claim 1 wherein the constriction belt is elastic.

3. The pregnancy simulation outfit of claim 1 wherein (i) the vest is configured and arranged to be worn over a torso of a human and has an inside surface, an outside surface and a frontal area with an upper portion and a lower portion, and (ii) the pregnancy simulation outfit further comprises (A) a weighted element, and (B) a pouch in the lower portion of the frontal area of the vest accessible from the outside surface of the vest for accommodating insertion and removal of the weighted element into and out from the pouch while the vest is worn without doffing the vest.

4. The pregnancy simulation outfit of claim 3 wherein the weighted element is a bladder having a valve for permitting the bladder to be selectively filled and emptied to achieve a desired weight.

5. The pregnancy simulation outfit of claim 4 wherein the bladder has an integral handle.

6. The pregnancy simulation outfit of claim 3 wherein the frontal area has a vertical dimension and a horizontal dimension when worn and the pouch is accessible through a horizontally extending closeable opening.

7. The pregnancy simulation outfit of claim 1 wherein the firm objects are spheres having a diameter of about 1 to about 8 cm.

* * * * *